June 26, 1962 C. R. FISHER, JR 3,041,475

ELECTRONIC POLAR RELAY

Filed March 13, 1958 2 Sheets-Sheet 1

INVENTOR.
CHARLES R. FISHER, JR.

BY [signature]

ATTORNEY

June 26, 1962 C. R. FISHER, JR 3,041,475

ELECTRONIC POLAR RELAY

Filed March 13, 1958 2 Sheets-Sheet 2

INVENTOR.
CHARLES R. FISHER, JR.
BY Francis E. Blake
ATTORNEY

United States Patent Office 3,041,475

Patented June 26, 1962

3,041,475

ELECTRONIC POLAR RELAY

Charles R. Fisher, Jr., Rochester, N.Y., assignor to General Dynamics Corporation, Rochester, N.Y., a corporation of Delaware Filed Mar. 13, 1958, Ser. No. 721,207
2 Claims. (Cl. 307—88.5)

Figure 1:
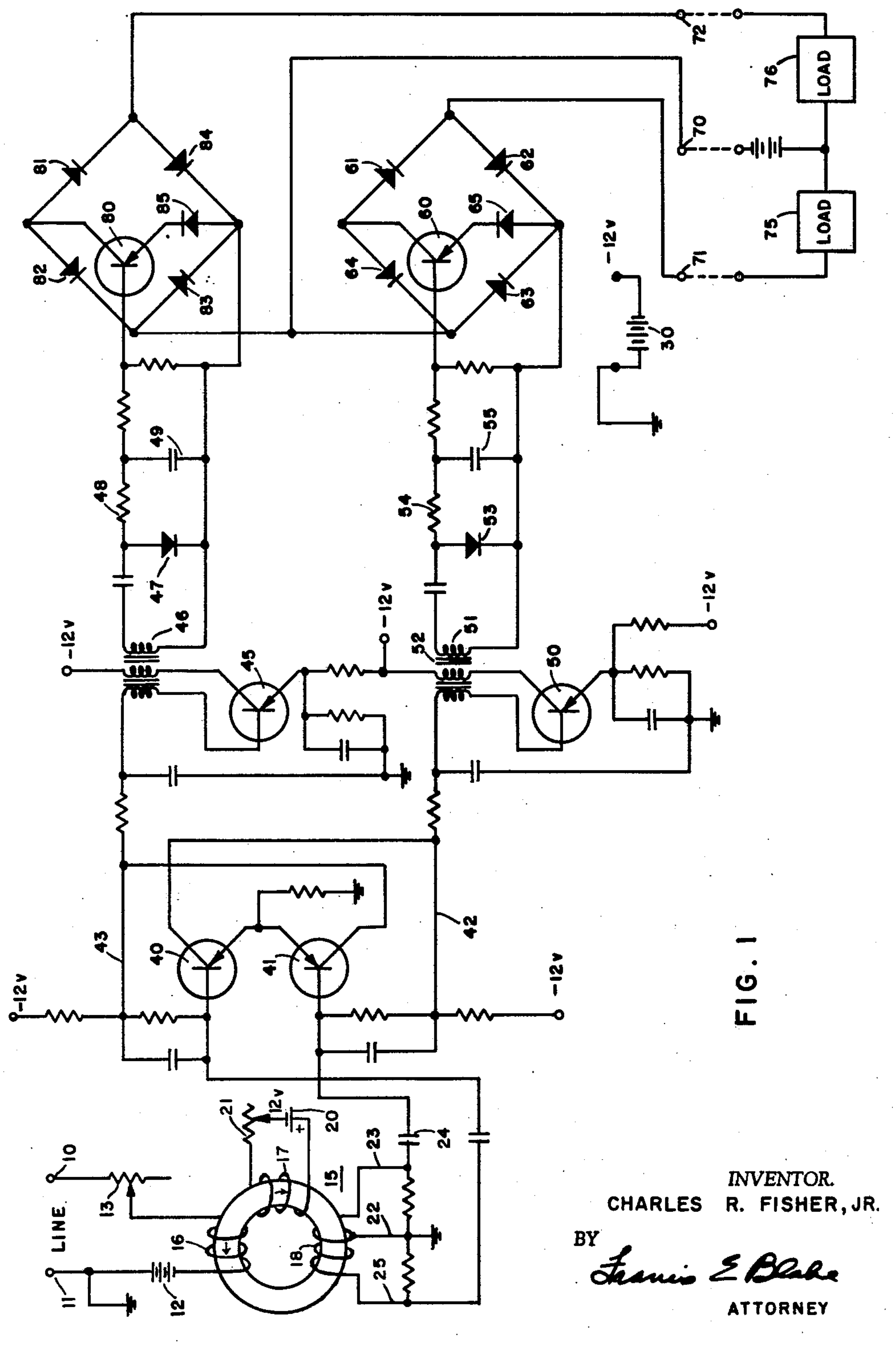

The present invention relates to an electronic switch and, more particularly, to a solid state circuit equivalent for an electrical relay and circuit therefor operable as either a polar or neutral pulsing relay.

Conventional communication lines employ so-called pulsing relays and circuits therefor to be operated by line current changes or pulsations to open and close circuit contacts as may be desired. One of the more commonly used pulsing circuits employs a so-called polar relay connected to a line and adapted to respond to reversals of polarity of line current that is substantially continuously flowing to open or close relay contacts accordingly. Another commonly used pulsing relay circuit may be referred to as a neutral arrangement in which the line current relay responds to changes in line current as indicated by current flow and no current flow where the polarity of a line current does not change. For certain conditions of operation, it may be desirable to provide a solid state equivalent for the polar or neutral line relays and circuits previously used where the obvious advantages of solid state devices would be advantageous.

It is a principal object of the present invention to provide an electronic circuit using solid state devices as an equivalent for a pulsing relay operable by line current changes or pulsations.

Another object of the invention is to provide a solid state electronic equivalent for a line relay of a neutral operation type which will respond to changes in line current from zero to maximum current and effect the desired circuit connections or disconnections accordingly.

Yet another object of the invention is to provide a solid state electronic equivalent of a polar relay responding to changes in polarity of line current to effect desired circuit connections and disconnections.

A feature of the invention is the provision of a square hysteresis loop magnetic core transformer coupled between the line having the current pulsations to be monitored and a transistorized bi-stable circuit controlling the energization of at least one transistor switch circuit. This arrangement is such that changes in the line current corresponding to the pulsations to be monitored cause the magnetic core to change from one state of remanence, such as positive remanence, to the other state of remanence, such as zero remanence, producing abrupt current pulses in its output winding for switching the bistable circuit and the associated transistor switch circuits. Since the changes in line current to be monitored are usually not abrupt changes but are more usually of the gradual changing type, the provision of the square hysteresis loop magnetic core transformer, according to the subject invention, provides a distinct advantage when such more or less gradual changes in line current are to be transformed into abrupt changes of current from the output of the core to effect a positive and effective control of the bi-stable circuit and associated transistor switch circuits. Also, the abruptly changing current pulses of one or the other polarity, as generated in the output winding of the magnetic core transformer, may be coupled to the bi-stable circuit in such a manner as to assure positive synchronism of the operation of the flip-flop circuit and associated transistor switch circuits so that a so-called mark condition of line current in the line circuit to be monitored is always translated into the corresponding mark condition of the transistor switch circuits which may be either closed or opened circuit contacts as may be desired.

Various other features and advantages of the invention will become apparent as the following description proceeds and the features of novelty which characterize the invention will be pointed out with particularity in the claims annexed to and forming a part of this specification.

Figure 2:
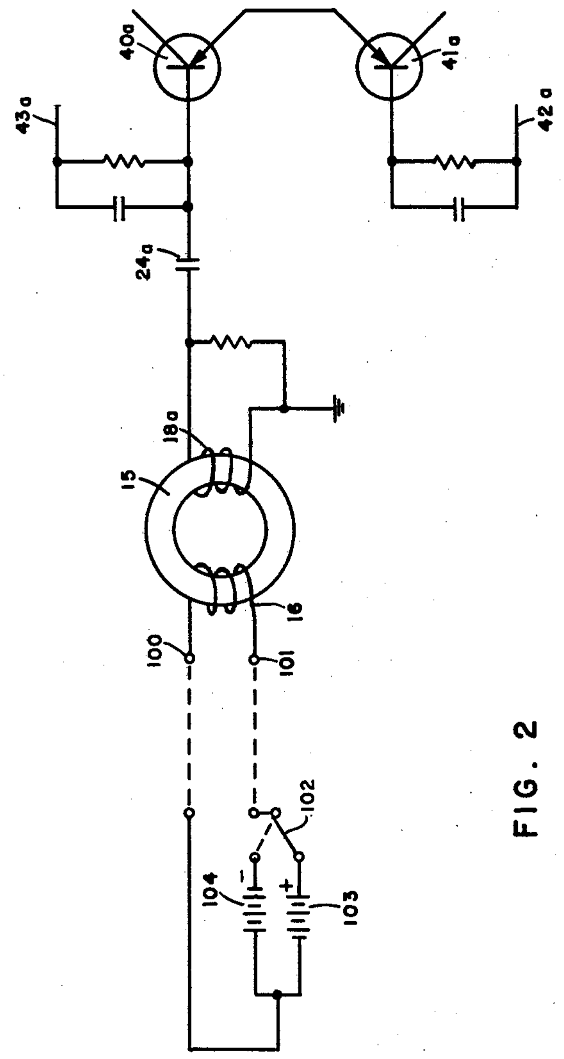

For a better understanding of the invention, reference may be had to the accompanying drawing in which:

FIG. 1 is a circuit diagram of the invention as it may be arranged to provide the solid state equivalent of neutral relay circuit operation to effect circuit connections and disconnections in accordance with the absence or presence of line current pulses to be monitored, and FIG. 2 is a fragmentary circuit diagram showing only those modifications to the circuit of FIG. 1 as required to provide the solid state electronic equivalent of polar relay circuit operation, and also showing a simplified form of magnetic core arrangement.

Referring to FIG. 1 of the drawing, line terminals 10 and 11 are shown and it will be understood that some remotely positioned circuit closing device may be employed to complete a circuit across the line terminals 10 and 11 and cause current to flow from the battery 12 to correspond to a mark condition of the line. Since the circuit of the invention, as shown in FIG. 1 of the drawing, is arranged for neutral operation, it will be understood that when the remote line contacts are opened, no current flows through the line from the battery 12 and the space condition for the line is thereby effected. The impedance of the line may be adjusted by any suitable device, such as the series rheostat 13 shown diagrammatically.

A square hysteresis loop magnetic core transformer 15 is provided with an input winding 16, a bias winding 17, and a center-tapped output winding 18 with the center tap connected to circuit ground. The input winding 16 is connected to the line in series with the previously described rheostat 13 and battery 12 so that the line current pulses on mark condition flow through the winding 16. The bias winding 17 is connected in series with a bias battery 20, which may be a twelve volt source, and a series rheostat 21, which is adjusted to normally bias the magnetic core 15 to one state of remanence in the absence of line current flowing through the input winding 16. On the other hand, the line current provided by the line battery 12 when flowing through the line upon closure of the distant line contacts, flows through the input winding 16 of the magnetic core 15 which is so arranged as to overcome the flux provided by the bias winding 17 and cause the core 15 to abruptly change to its other state of remanence. Each time the magnetic core 15 changes from one state of remanence to the other, and vice versa, output current pulses are induced in the output winding 18 and it should be obvious to those skilled in the art that these output currents will be of different polarity depending upon from which state of remanence the core is changing.

The transistorized bi-stable or flip-flop circuit and the transistor switch circuit to be described are suitably energized from a battery power source 30 which may provide an operating potential of twelve volts with the positive terminal connected to ground. It should be apparent that any suitable source may be employed and that the particular recitation of voltages and other system parameters is considered to be illustrative of one application of the invention and that the choice of such parameter values is entirely arbitrary within the skill of the art.

The transistorized flip-flop circuit consists of transistors 40 and 41 connected in a conventional manner for providing a bi-stable or flip-flop circuit, and for purposes of the present description, it will be initially assumed that transistor 41 is conductive and transistor 40 is non-conductive when the core 15 is in the state of remanence corresponding to a space condition of the line with no line current flowing in the input winding 16. Under such conditions, the conductor 42 is near minus twelve volts with transistor 40 non-conductive, while the conductor 43 is near minus one volt with transistor 41 conductive. The more negative voltage condition approximating minus twelve volts for conductor 42 causes the relaxation oscillator circuit, including the transistor 50, to oscillate generating an output signal in the winding 51 of transformer 52 which is rectified by the diode 53 and filtered by the filters, including resistor 54 and capacitor 55, for application to the transistor switch bridge circuit, including the transistor 60 which, in causing the trasistor 60 to conduct, closes a circuit across the output circuit contacts 70 and 71 and the desired load 75. Thus, the space condition for the line connected to terminals 10 and 11 causing no current flow in the input winding 16 of the magnetic core 15 effects a closure of the transistor switch across contacts 70 and 71. The transistor switch circuit, including the transistor 60 in the bridge circuit with diodes 61, 62, 63, 64, and 65, is described in detail in the copending application of Robert B. Trousdale, Serial No. 634,649, filed January 17, 1957, now Patent No. 2,866,909, and assigned to the same assignee as the subject invention. Therefore, a detailed description of the operation of this transistor switch circuit, including the transistor 60, or the second transistor switch circuit, including the transistor 80 and its associated diodes 81—85, will not be further described in detail.

Assume now that the remote circuit contacts for the line are closed to complete a loop circuit across the line terminals 10 and 11 and cause a line current to flow in the input winding 16 corresponding to a mark condition of the line. Under these conditions, as previously stated, the magnetic core 15 abruptly changes from its former one state of remanence to the other state of remanence and the parameters of the circuit are such that during this change in remanence a current is caused to flow in the output winding 18 producing a positive current pulse between center tap terminal 22 and terminal 23. This positive current pulse is coupled through capacitor 24 to the base of the bi-stable circuit transistor 41 which had been conducting causing the transistor 41 to now become non-conductive. As the transistor 41 becomes non-conductive, the transistor 40 becomes conductive due to the conventional bi-stable circuit interconnections, as shown in FIG. 1 of the drawing. With transistor 40 now conductive and transistor 41 non-conductive, the potential in conductor 42 drops to about minus one volt whereas the potential in conductor 43 increases from minus one volt to approximately minus twelve volts. The drop in minus potential for conductor 42 causes the transistor relaxation oscillator circuit, including the transistor 50, to stop oscillating while at the same time the increase in minus potential in conductor 43 causes the transistor oscillating circuit, including the transistor 45, to become oscillatory thereby creating an output current in the transformer output winding 46 to be rectified by the diode 47 and filtered by the resistor 48 and capacitor 49 for application to the base of the transistor switch 80. Therefore, the transistor switch 80 is closed while the transistor switch 60 is now opened since the respective transistor oscillators 45 and 50 are now oscillatory and non-oscillatory. Therefore, for the mark condition of the line being described, the circuit is closed across output terminals 70 and 72 to complete a circuit through the load 76 while the circuit across the output terminals 70 and 71 is disconnected or opened to open the circuit through the load 75.

Upon the reopening of the distant line contacts across line terminals 10 and 11 corresponding to a re-establishment of the space condition with no current flowing through the input coil 16, the magnetic core 15 again changes back to the one state of remanence as biased by the bias current in coil 17 causing a momentary current pulse of positive polarity to flow between the center tap terminal 22 and terminal 25 of the output winding 18, thus again causing transistor 40 of the bi-stable circuit to become non-conductive and transistor 41 to become conductive. With transistor 40 now non-conducting and transistor 41 again conducting, the resultant rise of minus potential of conductor 42 causes the transistor oscillator circuit, including the transistor 50, to again become oscillatory while the reduction of minus potential for conductor 43 causes the oscillator circuit including transistor 45 to again become non-oscillatory and causing the transistor switch 60 to again become conductive and the transistor switch 80 to become non-conductive thereby re-establishing the circuit across output terminals 70 and 71 corresponding to the space condition with the circuit across output terminals 70 and 72 open.

It should now be apparent that a space condition for the line connected to terminals 10 and 11 causing no current to flow in the input winding 16 will always result in bi-stable transistor 41 being conductive and bi-stable transistor 40 being non-conductive so that the associated electronic switch circuits, including the transistor oscillators 45 and 50 and the transistor switches 60 and 80, are always in the corresponding space condition for closing a circuit across output terminals 70 and 71 and opening a circuit across terminals 70 and 72. Conversely, a mark condition for the line connected to terminals 10 and 11 causing current to flow in the input winding 16 will always cause flip-flop transistor 40 to be conductive and flip-flop transistor 41 to be non-conductive so that the associated transistor switch contacts employing transistor 80 are closed with transistor switch contacts using transistor 60 open to complete a circuit between terminals 70 and 72 and open the circuit between terminals 70 and 71. Thus, a distinct advantage is achieved by this invention in that the synchronism between the circuit conditions across terminals 70, 72 and 70, 71 in correspondence with the mark and space conditions for the line connected to terminals 10 and 11 is always maintained even though a given mark or space condition may be missed in a series train of mark and space conditions.

Referring now to FIG. 2 of the drawing, the circuit arrangement, which has been described in detail in connection with FIG. 1, is shown to be slightly modified in order to provide the equivalent of polar relay operation wherein line current always flows in the line to be monitored but the mark and space conditions are indicated by changes in polarity of the line current. The line terminals 100 and 101 may be connected at the distant end through a pulsing switch 102 to either battery 103 or battery 104 which are oppositely poled so that the line current which flows through the input winding 16 of the magnetic core transformer 15 is either one polarity or the other, but always flowing except during contact transfer. It may be said, for example, that a mark condition corresponds to the solid line position of the line switch 102 as shown to connect a current flowing from battery 103 with a negative polarity from terminal 100 to terminal 101 through the input winding 16. If such is the case, then the space current would correspond to the dotted line position of the switch 102 to alternatively connect battery 104 and establish a flow of current of positive polarity from terminal 100 to terminal 101 through input winding 16 of the magnetic core transformer 15. With this polar operation, the bias winding 17, as shown in FIG. 1 of the drawing, may not be needed and therefore is not shown in FIG. 2 of the drawing. The reversal of polarity of line current flowing through the input winding 16 causes the magnetic core 15 to abruptly change from one state of remanence to the other state of remanence causing abruptly changing output currents to flow in the output winding 18*a* which, in this case, need not be center-tapped. One terminal of the output winding 18*a* may be connected to ground and the other terminal may be connected through a coupling capacitor 24*a* to the base of transistor 40*a* in the flip-flop or bi-stable circuit with transistor 41*a*. The details of the bi-stable circuit, including transistors 40*a* and 41*a*, are not shown since they may be the same as described and shown in connection with FIG. 1 using transistors 40 and 41. Also, the transistor oscillators and associated transistor switches such as previously shown and described in connection with FIG. 1 for connection, respectively, to conductors 43*a* or 42*a* of FIG. 2, are the same and will not be further described.

The polar operation of FIG. 2 should now be readily apparent. Assume that transistor 40*a* is initially conducting and transistor 41*a* is non-conducting and a space condition for the line connected to line terminals 100 and 101 is existing with the positive polarity current flowing from terminal 100 to terminal 101. With a change in polarity of line current, upon the operation of the remote polar line switch 102, the magnetic core 15 abruptly changes to the other state of remanence causing a brief current pulse to flow in output winding 18*a* with a polarity such as to drive the base of transistor 40*a* more positive to cause transistor 40*a* to become non-conductive and at the same time cause transistor 41*a* to become conductive due to the bi-stable circuit connections. This reversal of conductive states, respectively, for the bi-stable transistors 40*a* and 41*a* causes the relative amplitudes of voltages in conductors 42*a* and 43*a* to reverse, thus reversing the condition of the associated transistor switches to establish the associated mark condition. A subsequent operation of the line switch 102 to again connect battery 103 in the line and re-reverse the polarity of current flow through the input winding 16 to re-establish the space condition again causes the magnetic core 15 to change to its one state of remanence thus producing a momentary surge of current in the output winding 18*a* now with a polarity such as to again drive the base of transistor 40*a* more negative causing transistor 40*a* to become conductive and transistor 41*a* to again become non-conductive. This re-reversal of the conductive states for the bi-stable transistors 40*a* and 41*a* also re-reverses the associated transistor switch contacts in the same manner as has been described in detail in connection with FIG. 1 of the drawing.

It will be seen that in both forms of the invention, as described in connection with both FIGS. 1 and 2 of the drawing, that changes in line current as applied to the input winding 16 of the associated magnetic core transformer 15 produce output pulses in the output winding of the magnetic core transformer which are of short duration and of abrupt nature. These output pulses are generated only during the change of remanence of the magnetic core transformer 15 and do not continue after the new state of remanence for the magnetic core transformer 15 is established. Therefore, the provision of the magnetic core transformer 15 having the square hysteresis loop characteristic, according to the invention, provides in effect a form of pulse correction circuit between the pulsating changes of line current to be monitored and a bi-stable circuit to be controlled for effecting the desired operation of the transistor switch circuits.

While the invention has been particularly described in connection with an arrangement whereby two transistor switch circuits are alternately open and closed by the respective mark and space conditions of the line to be monitored by the solid state pulsing relay circuit of the invention, it should be obvious that the invention is not limited to the provision of any particular arrangement or number of transistor switch circuits. For example, only a single transistor switch circuit may be affected, such as that circuit employing the transistor 60, so that the mark and space conditions of the line may be respectively indicated by either an opened or closed circuit across the terminals 70 and 71. In other words, only the equivalent of a so-called relay C-contact arrangement has been described using both the transistor switches 60 and 80. As should be apparent to those skilled in the art, other equivalent relay circuit contact arrangements could be provided by suitable choice of the type of transistor switches 60 and 80 to be associated with the bi-stable circuit including the transistors 40 and 41 that is controlled by the magnetic core transformer 15.

Various other modifications will occur to those skilled in the art within the spirit of the invention and the scope of the appended claims.

What is claimed is:

1. An electronic polar relay comprising, a magnetic core having a substantially square hysteresis loop characteristic, said core having an input winding and an output winding, a signal source coupled to said input winding for causing said core to change from one bistable state to another bistable state, a bistable circuit, means connected between said output winding and the input circuit of said bistable circuit for switching said bistable circuit from one state to another in response to the aforementioned change in the bistable state of said magnetic core, a first and second diode switching circuit, means for coupling one output terminal of said bistable circuit to the control circuit of said first diode switching circuit, means for coupling the other output terminal of said bistable circuit to the control circuit of said second diode switching circuit, a source of operating voltage and a first and second load circuit, means for coupling the first terminal of each load circuit to the first terminal of said source of operating voltage, means for coupling the second terminal of said first load circuit to the first output terminal of said first diode switching circuit, means for coupling the second terminal of said second load circuit to a first output terminal of said second diode switching circuit, and means for coupling the second output terminals of each of said diode switching circuits to the second terminal of said source of operating voltage.

2. An electronic polar relay comprising, a magnetic core having a substantially square hysteresis loop characteristic, said core having an input winding and an output winding, a signal source coupled to said input winding for causing said core to change from one bistable state to another bistable state, a bistable electrical circuit, means connected between said output winding and the input circuit of said bistable electrical circuit for switching said bistable circuit from one state to another in response to the aforementioned change in the bistable state of said magnetic core, a first and second oscillator, means for coupling the control circuit of said first oscillator to a first output terminal of said electrical bistable circuit, means for coupling the control circuit of said second oscillator to a second output terminal of said bistable electrical circuit, a first and second diode switching circuit, first means for coupling the output circuit of said first oscillator to the control circuit of said first diode switching circuit, said first coupling means including means to convert the A.C. output of said oscillator into a D.C. control signal, second means for coupling the output circuit of said second oscillator to the control circuit of said second diode switching circuit, said second coupling means further including means for converting the A.C. output of said second oscillator to a D.C. control signal, a source of operating voltage and a first and second load circuit, means for coupling the first terminal of each load circuit to the first terminal of said source of operating voltage, means for coupling the second terminal of said first load circuit to the first output terminal of said first diode switching circuit, means for coupling the second terminal of said second load circuit to the first output terminal of said second diode switching circuit, and means for coupling the second output terminals of each of said diode switching circuits to the second terminal of said source of operating voltage.

(References on following page)

References Cited in the file of this patent

UNITED STATES PATENTS

| | | |
|---|---|---|
| 2,428,126 | Nicholson | Sept. 30, 1947 |
| 2,430,457 | Dimond | Nov. 11, 1947 |
| 2,591,406 | Carter | Apr. 1, 1952 |
| 2,691,155 | Rosenberg | Oct. 5, 1954 |
| 2,692,963 | Hathaway | Oct. 26, 1954 |
| 2,697,825 | Lord | Dec. 21, 1954 |
| 2,734,184 | Rajchman | Feb. 7, 1956 |
| 2,783,384 | Bright | Feb. 26, 1957 |
| 2,784,391 | Rajchman | Mar. 5, 1957 |
| 2,816,230 | Lindsay | Dec. 10, 1957 |
| 2,866,909 | Trousdale | Dec. 30, 1958 |
| 2,894,250 | Rochelle et al. | July 7, 1959 |
| 2,910,688 | Kelley | Oct. 27, 1959 |